May 8, 1928.  1,668,625
F. BOYER ET AL
ARRANGEMENT FOR LIFTING THE WHEELS OF VEHICLES
Filed May 10, 1926  2 Sheets-Sheet 1
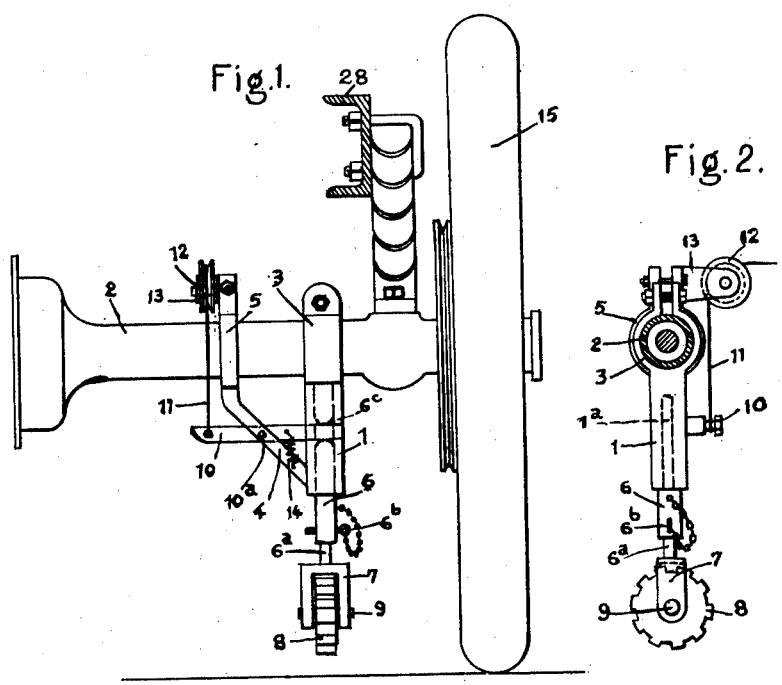
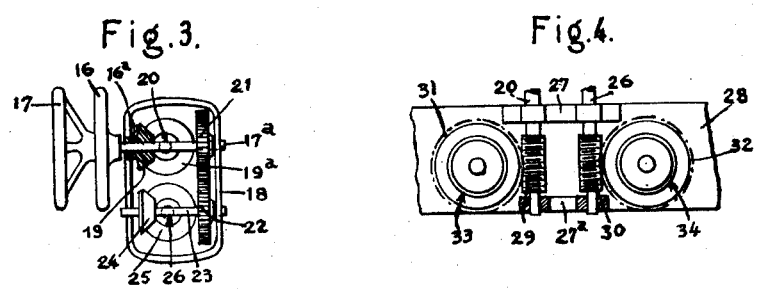
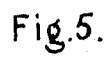
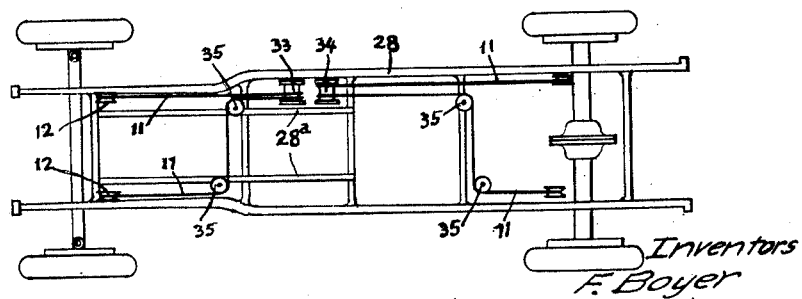
Inventors
F. Boyer
R. Weler
by Langner Parry Card & Langner
Att'ys.

May 8, 1928. 1,668,625
F. BOYER ET AL
ARRANGEMENT FOR LIFTING THE WHEELS OF VEHICLES
Filed May 10, 1926 2 Sheets-Sheet 2
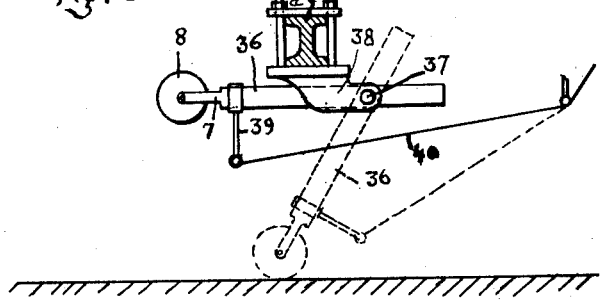
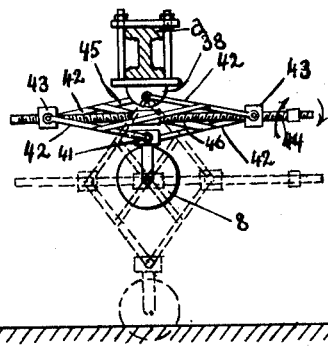
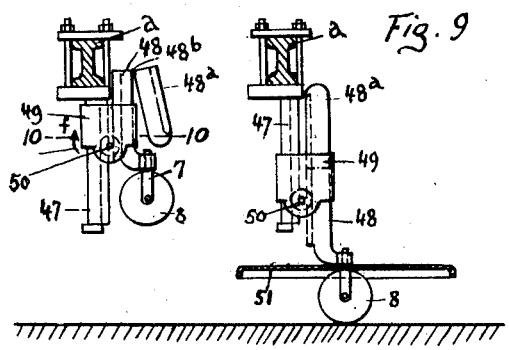
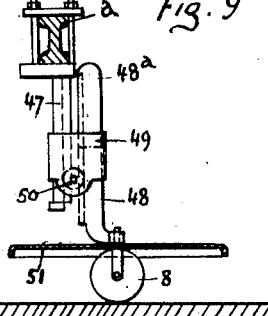
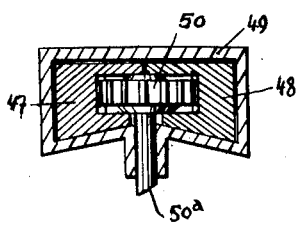
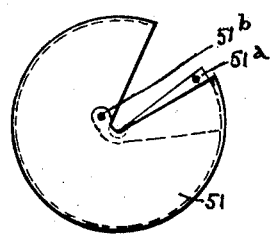
Inventors
F. Boyer
F. Weler
by
Langner Parry Card & Langner Atty's.

Patented May 8, 1928.

1,668,625

UNITED STATES PATENT OFFICE.

FERNAND BOYER AND ROBERT WELER, OF PARIS, FRANCE.

ARRANGEMENT FOR LIFTING THE WHEELS OF VEHICLES.

Application filed May 10, 1926, Serial No. 108,157, and in France May 14, 1925.

The present invention has for its object an arrangement for the lifting of the wheels of automobile and other vehicles out of contact with the ground.

This arrangement consists of four lifting jacks each located in the vicinity of one of the road wheels, which jacks the driver controls from his seat by means of hand wheels or operating levers through the intermediary of cables or similar flexible connections, and of force increasing mechanisms.

The devices for operating the lifting jacks are, preferably, correlated in such a way that the two wheels on the same axle are lifted simultaneously.

The movable portion of each lifting jack is provided at that one of its extremities which has to bear upon the ground, with a roller mounted on a horizontal axis and of which the bracket can pivot around a vertical axis, which arrangement gives to the vehicle a certain amount of mobility in every direction when its four road wheels are raised.

The jacks can be constructed in such a manner that they move out of the way automatically when resuming their inoperative position, and consequently they occupy the least possible space below the chassis of the vehicle in this position. For this purpose, there may be given, in particular, to the movable part of the jacks, the shape of a rod pivoted to the axle, or that of an articulated parallelogram, or again, that of a toothed rack meshing with a pinion also in engagement with a rack on the fixed part of the jack.

We have shown by way of example on the annexed drawing, one of the forms of carrying out the arrangement which is the subject of the invention.

Figure 1 is a side view of one of the rear jacks.

Figure 2 is a front view of the same jack.

Figure 3 is a diagrammatic view in plan of the operating mechanism.

Figure 4 is a diagram in elevation of the power increasing mechanism.

Figure 5 is a general diagram of the lay out.

Figure 6 shows in outline a jack with a rod pivoted to the axle.

Figure 7 is a similar view of a jack provided with a jointed parallelogram.

Figures 8 and 9 are views in outline of a rack-fitted jack.

Figure 10 is a section on a larger scale, taken through the horizontal plane 10—10 of Figure 8.

Figure 11 is a plan view of an accessory.

Each of the jacks is in the example shown in Fig. 1, composed of a socket 1 vertically arranged below the differential axle casing 2 by means of the split collar 3. The socket 1 is buttressed by an oblique arm 4 which connects its lower extremity with another collar 5 similar to the first and like it clamped upon the axle casing. The jacks for the front wheels are fixed to the corresponding axle in a similar manner.

In the socket 1 there can slide a hollow bar 6, in which there slides in its turn a rod $6^a$ which is fixed in the desired position by means of the locking pin $6^b$, which passes through one of various transverse holes formed along its length. The rod $6^a$ is provided at its base with a forked arm or bracket 7, loosely mounted thereon, and this fork carries the roller 8, having a furrowed periphery, mounted upon a horizontal axis 9.

The bar 6 is bored perpendicularly to the axis of the vehicle, with a mortise $6^c$ into which enters the extremity of a lever 10 pivoted at $10^a$ upon the buttress arm 4. A longitudinal slot $1^a$ formed in the wall of the socket 1 affords a passage for this lever 10 during its oscillating movements. These latter are communicated to it by the cable 11 which passes over the guide pulley 12 mounted upon an axle which carries a fork arm or bracket 13 fixed to the collar 5. The lever 10 is provided with a recall spring 14 which tends to bring back the bar 6 to its highest position, the roller being then raised well above the ground. When a pull is exerted upon the cable 11, this roller, on the other hand, is caused to bear upon the ground and lifts out of contact with the latter, the road wheel 15 to which this jack belongs. By reason of the adjustable sliding movement of the rod $6^a$ in the bar 6, the degree of lift of each wheel can be made appropriate to the slope of the ground.

With the operating mechanism which Figures 3 and 4 show diagrammatically, the lifting pull is exerted upon the cable 11 by the driver without it being necessary for the latter to leave his seat.

This mechanism comprises two hand wheels 16, 17, keyed upon two horizontal concentric shafts $16^a$—$17^a$ journaled in a casing 18 within reach of the right hand of the driver. The shaft 16ª is provided with a bevel pinion 19 which meshes with another similar pinion 19ª keyed upon a shaft 20 arranged vertically. Upon the shaft 17ª is arranged a spur-wheel 21 which meshes with a similar spur wheel 22, the latter being fast upon the shaft 23 journaled in the casing 18 parallel to the shafts 16ª—17ª. The shaft 23 rotates a bevel wheel 24 in engagement with a pinion 25 of the same shape made fast to the shaft 26, the latter being arranged in principle parallel with the shaft 20. At their lower extremities which extend to the level of the chassis, the shafts 20, 26 are received in bearings 27, 27ª secured to one of the longitudinal side members 28; each of them is provided with a worm 29, 30. The first worm engages a worm wheel 31, the second a similar wheel 32. These wheels are keyed respectively upon the ends of drums 33, 34, the shafts of which are arranged in bearings, (not shown) secured on the one hand to the longitudinal side member 28 and on the other hand to the side member 28ª of the sub-frame. Upon the drum 33 there are wound those of the cables 11 which correspond with the front jacks and upon the drum 33, those of these cables which operate the rear jacks (Figure 5). Both sets of said cables are guided when it is necessary from the windlass or drum to the pulleys 12, by guide pulleys 35 of the same kind as those last mentioned, and of which the brackets or fork arms are fixed to the side members of the chassis or to the cross-members thereof.

According to Figure 6, the movable part of the jack is composed of a rod 36 vertically pivoted at 37 upon a support 38 fixed to the axle $a$. At one of its extremities the rod 36 is provided with a roller 8 mounted in a pivoting bracket or fork arm 7. A little in advance of this bracket, it is furnished with an arm 39 to which is attached the operating connection 40 for the jack.

When the jack is not in use, the rod 36 is arranged horizontally, the roller being preferably turned towards the front of the vehicle. When a pull is exerted on the connection 40, the rod 36 pivots until its roller bears upon the ground (which position is indicated in dotted lines). Thence onward when the pull is continued upon the connection 40, the setting upright of the rod 36 which results therefrom effects the lifting of the wheel until this rod has reached the vertical position, its tail then abutting against the axle.

In the modification of Figure 7, the bracket for the roller 8 is carried by a traveller 41 arranged at one of the extremities of a pivoted lozenge-shaped member. This latter is composed of bars 42 jointed at one end to the traveller 41 or to the support 38 clamped to the axle $a$ and on the other hand to the lateral travellers 43. These last mentioned are perforated parallel with the axis of the vehicle with screw-threaded holes with which engages a screw 44 of which the halves are screw-threaded with portions of opposite pitch. This screw has a smooth middle portion which is trunnioned between two rings in a member 45 upon which are pivoted two stay rods 46 each connecting the middle points of two opposite bars 42. When not in operation, the lozenge formed by the bars 42 has the flattened form shown in full lines in Figure 7. When the screwed shaft 44 is turned in a suitable direction by means of a flexible or jointed shaft, the travellers 43 come together and the roller 8 descends in contact with the ground, afterwards causing the lifting of the wheel (the descent of the roller is indicated in dotted lines in Figure 7). In the following modification, the body of the jack is formed of two parallel rods 47, 48 of U-section of which the wings face one another. The first is secured to the axle $a$, the second is guided in a slideway housing 49 surrounding the two rods. At the bottom of the hollow portion of the rods 47 and 48 are formed racks with which meshes a pinion 50 mounted at the end of a shaft 50ª which turns in a lug on the slideway 49 and which is operated by flexible, or a ball-jointed, or a universally jointed shaft. The rod 48 is formed in two sections; the upper section 48ª is hinged at 48ᵇ on the lower section in such a way that it would be folded down on the side remote from the rod 47 when the jack is not in use (Figure 8). If the pinion then receives a movement of rotation in the direction of the arrow $f$, this pinion travels along the rack on the part 47 and the rack of the part 48 travels upon it so that a reciprocal sliding of these rods takes place in the direction which corresponds with the lowering of the roller 8. When the top of the lower section 48 reaches the height of the upper edge of the slideway 49 the section 48ª abutting against this edge lines up vertically so that it is brought into alignment with the section 48 and is maintained there by the slideway housing 49 when the downward movement of this last mentioned section continues.

Upon Figure 9 we have shown mounted above the roller 8, a removable horizontal disc 51 with an outwardly directed flange which permits the jack to act when the roller 8 sinks in soft ground.

Figure 11 shows how this disc can be arranged to enable it to be put in place and to be removed both easily and rapidly. For this purpose, the disc is provided with a cut-out portion which towards the centre of the disc provides a circular seat for the pivoting socket of the bracket 7 upon which the disc is slipped. The cut-out portion mentioned is afterwards closed by the sector 51ª pivoted at 51ᵇ.

Obviously the invention is not limited to the shapes or details of construction described above purely by way of example, but the invention can be carried out with all modifications based upon the same principle; thus the hand wheels 16, 17 instead of being located in the vicinity of the straight side member might be moved within the width of the chassis, according to the position occupied by the seat of the driver.

What we claim is:

1. A jack carried by a vehicle adjacent a wheel thereof, comprising two standards provided with racks facing each other, one of said standards constituting the part fixed to the vehicle, and the other the movable part, a toothed wheel located between said racks, a guide in which said toothed wheel is mounted, said guide surrounding said standards and being slidable thereupon, the movable standard being divided in sections, hinged one to the other in such manner that the upper part lowers itself automatically by tilting when it is extended above the guide, and automatically resetting itself in alignment with the lower part when it again reenters said guide.

2. In a vehicle, the combination of a set of jacks one for each vehicle wheel, means for lifting said jacks selectively in pairs or all together, casters on said jacks, and members having flat ground engaging surfaces of considerable area carried by said jacks above said casters.

In testimony whereof we have signed our names to this specification.

FERNAND BOYER.
ROBERT WELER.